US012644815B2

(12) United States Patent
Wang et al.

(10) Patent No.: US 12,644,815 B2
(45) Date of Patent: Jun. 2, 2026

(54) DEVICE AND METHOD FOR REPRESENTING THE FOAM POROSITY STATE OF FOAMED LIGHTWEIGHT SOIL WITH SELF-ADJUSTING BEAMS

(71) Applicant: SOUTHWEST JIAOTONG UNIVERSITY, Chengdu (CN)

(72) Inventors: Wubin Wang, Chengdu (CN); Yanfei Pei, Chengdu (CN); Qian Su, Chengdu (CN); Junjie Huang, Chengdu (CN); Yipeng Lai, Chengdu (CN); Wenyi Jia, Chengdu (CN); Rongwei Fan, Chengdu (CN); Aibo Luo, Chengdu (CN); Xun Wang, Chengdu (CN); Chenling Zhou, Chengdu (CN); Chengjin Wang, Chengdu (CN); Zongyu Zhang, Chengdu (CN)

( * ) Notice: Subject to any disclaimer, the term of this patent is extended or adjusted under 35 U.S.C. 154(b) by 0 days.

(21) Appl. No.: 19/109,288

(22) PCT Filed: Jul. 3, 2024

(86) PCT No.: PCT/CN2024/103264
§ 371 (c)(1),
(2) Date: Mar. 6, 2025

(87) PCT Pub. No.: WO2025/077310
PCT Pub. Date: Apr. 17, 2025

(65) Prior Publication Data
US 2026/0002859 A1     Jan. 1, 2026

(30) Foreign Application Priority Data
May 29, 2024    (CN) .......................... 202410682879.6

(51) Int. Cl.
*G01N 15/08*          (2006.01)

(52) U.S. Cl.
CPC ....... *G01N 15/0806* (2013.01); *G01N 15/088* (2013.01)

(58) Field of Classification Search
CPC ............. G01N 15/0806; G01N 15/088; G01N 2291/0232; G01N 2291/02827; G01N 2291/0289; G01N 29/07; G01N 29/11; G01N 29/223; G01N 29/2437
USPC ............................................. 73/38
See application file for complete search history.

(56) References Cited

FOREIGN PATENT DOCUMENTS

| AU | 2009271493 B2 | * | 11/2013 | ............. G01N 29/46 |
|---|---|---|---|---|
| CH | 679245 A5 | | 1/1992 | |
| CN | 102178571 A | * | 9/2011 | |
| CN | 111487324 A | | 8/2020 | |

(Continued)

*Primary Examiner* — Marrit Eyassu

(57) ABSTRACT

A device and method for representing the foam porosity state of foamed lightweight soil with self-adjusting beams, and relates to the technical field of sound absorption coefficients measurement; the device includes a standing wave tube, a plurality of polyvinylidene fluoride piezoelectric films, a sensor, an exciter, a push-pull handle, an adjustable telescopic tube, a foamed lightweight soil detection material, a charge amplifier, a data memory, a data adapter, a signal generator, an adaptive power amplifier board, and a PC computer; the device of the invention has low cost, long service life, high measurement accuracy, relatively simple production process, and can be applied to different scenarios.

8 Claims, 3 Drawing Sheets

(56)            References Cited

FOREIGN PATENT DOCUMENTS

CN          214472991  U     10/2021
CN          115372469  A   *  11/2022   ............ G01N 29/04

* cited by examiner

PC computer 6-3

6-5

6-4

6-2

6-6

6-1

DEVICE AND METHOD FOR REPRESENTING THE FOAM POROSITY STATE OF FOAMED LIGHTWEIGHT SOIL WITH SELF-ADJUSTING BEAMS

1. TECHNICAL FIELD

The invention belongs to the technical field of sound absorption coefficients measurement, specifically relates to a device and method for representing the foam porosity state of foamed lightweight soil with self-adjusting beams.

2. BACKGROUND ART

At present, the railroad is an indispensable transportation tool for communication between urban and rural material exchange and economic development, and in the process of railroad construction and operation, some noises, such as traffic noise and railroad roadbed construction noise, etc., are flooded in people's daily life, which not only causes great harm to people's physical as well as psychological health, but also exacerbates the damage speed of the railroad track unevenness, therefore, how to control the noise pollution is becoming more and more important.

Foamed lightweight soil, as a new geotechnical material, has been gradually used in the filling of railroad roadbeds, bridgehead transition sections, and deep soft soil roadbeds. Due to its excellent sound absorption performance and low cost, foamed lightweight soil has many advantages as a filler for railroad roadbeds, and has been proved in construction practice. The use of foamed lightweight soil as a sound absorption material for controlling noise pollution is a good choice both from the point of view of economy and effectiveness; for foamed lightweight soil sound absorption material, the sound absorption coefficient is a very rigorous portrayal of the material's absorption of sound, and the coefficient of absorption is related to sound absorption effect of the material.

Therefore, there is a need for a experimental device for intelligent representation of foam porosity state of foamed lightweight soil with self-adjusting beams to accurately measure the sound absorption coefficients of foamed lightweight soil used as roadbed filling materials in different railroad roadbed sections.

3. SUMMARY OF THE INVENTION

In order to solve the above problems, the invention proposes a device and method for representing the foam porosity state of foamed lightweight soil with self-adjusting beams.

The technical solution of the present invention is: a device for representing the foam porosity state of foamed lightweight soil with self-adjusting beams includes a standing wave tube, a plurality of polyvinylidene fluoride piezoelectric films, a sensor, an exciter, a push-pull handle, an adjustable telescopic tube, a foamed lightweight soil detection material, a charge amplifier, a data memory, a data adapter, a signal generator, an adaptive power amplifier board, and a PC computer;

The foamed lightweight soil detection material is provided on the standing wave tube; one side of the foamed lightweight soil detection material is provided with the sensor; other side of the foamed lightweight soil detection material is provided with the exciter; one side of the standing wave tube proximate to the exciter is provided with the push-pull handle; other side of the standing wave tube proximate to the sensor is provided with the adjustable telescopic tube; the adjustable telescopic tube is connected to a plurality of polyvinylidene fluoride piezoelectric films; and a plurality of polyvinylidene fluoride piezoelectric films are all connected to the charge amplifier; the charge amplifier is communicatively connected to the data memory; the data memory is further communicatively connected to the data adapter and the signal generator, respectively; the data adapter is further connected to the PC computer; the signal generator is further communicatively connected to the adaptive power amplifier board; the adaptive power amplifier board is further communicatively connected to the exciter.

Further, the adjustable telescopic tube includes a front telescopic tube, a middle telescopic tube, a rear telescopic tube, a tractor, a first telescopic adjuster, and a second telescopic adjuster;

one end of the front telescopic tube is sleeved over one end of the middle telescopic tube; other end of the middle telescopic tube is sleeved over one end of the rear telescopic tube; the first telescopic adjuster is provided in the rear telescopic tube; the second telescopic adjuster is provided in the middle telescopic tube; and the first telescopic adjuster and the second telescopic adjuster are connected via the tractor.

The invention has the following advantages:

(1) the device can automatically adjust and configure the foamed lightweight soil with different densities and adopt sound waves with different frequencies, can obtain the relationship between different porosity masses and wave velocity of different sound waves under different frequencies after a large number of tests are carried out, and can be fitted, and can judge whether the foamed lightweight soil at a sampling site is damaged or not and the damage degree only by sampling and detecting the foamed lightweight soil on site in engineering;

(2) the device can judge whether the sound insulation effect of the foamed lightweight soil with different densities is good or not according to the voltage formed by transmitting sound waves to the polyvinylidene fluoride piezoelectric films at different positions through the foamed lightweight soil, and whether the sound insulation effect meets the specification or not, and automatically adjust the telescopic tube according to the transmission effect of sound waves so as to obtain positions with different percentages of sound insulation effects;

(3) the device has a low cost of equipment, a long service life, a high precision of measurement, a relatively simple production process, and can be applied to different scenarios.

Based on the above device, the invention also proposes a method for representing the foam porosity state of foamed lightweight soil with self-adjusting beams, comprising the following steps:

S1. using the exciter to send sound waves to the foamed lightweight soil detection material, and using the sensor to receive sound wave signals to determine transverse wave velocity and the longitudinal wave velocity of the foamed lightweight soil detection material;

S2. determining an attenuation function of the sound waves based on the transverse wave velocity and the longitudinal wave velocity of the foamed lightweight soil detection material;

S3. obtaining an acoustic reflection factor based on the attenuation function of the sound waves;

S4. based on the acoustic reflection factor, determine the incident sound absorption coefficient;

S5. based on the incident sound absorption coefficient, determine sound insulation results of the foamed lightweight soil detection material.

Further, in S1, the calculation formula for longitudinal wave velocity of the foamed lightweight soil detection material $V_P$ is:

$$V_p = \frac{L}{t_p - t_0};$$

wherein, L denotes length of the foamed lightweight soil detection material, $t_p$ represents time experienced by the longitudinal wave traveling through the foamed lightweight soil detection material, $t_0$ denotes delay time.

Further, in S1, the calculation formula for the transverse wave velocity of the foamed lightweight soil detection material $V_S$ is:

$$V_s = \frac{L}{t_s - t_0}$$

wherein, L denotes length of the foamed lightweight soil detection material, $t_0$ denotes delay time, $t_s$ represents time experienced by the transverse wave traveling through the foamed lightweight soil detection material.

Further, in S2, expression for attenuation function of the sound wave F(x) is:

$$F(x) = Ae^{-\alpha x}\cos[\beta(x - x_0)];$$

wherein, A denotes amplitude, x denotes relative position of the sound wave from the exciter, $x_0$ indicates relative position of the sound wave when it is emitted, e indicates index, $\alpha$ indicates attenuation coefficient, $\beta$ indicates phase coefficient.

Further, in S3, expression for acoustic reflection factor r is:

$$r = \frac{H - e^{-jk_0d}}{e^{jk_0d} - H}e^{2jk_0(l+d)}$$

wherein, H denotes transfer function of the total sound field, e denotes exponent, j denotes complex number, $k_0$ denotes complex wave number, l denotes distance of the polyvinylidene fluoride piezoelectric films from the foamed lightweight soil material, d denotes distance between neighboring polyvinylidene fluoride piezoelectric films.

Further, in S4, the calculation formula for the incident sound absorption coefficient R is:

$$R = 1 - |r|^2;$$

wherein, r denotes acoustic reflection factor.

The beneficial effects of the present invention is as follows: the method for representing the foam porosity state of foamed lightweight soil has high measurement accuracy, relatively simple detection process, and can be applied to different scenarios.

4. BRIEF DESCRIPTION OF ACCOMPANY DRAWINGS

As shown in the accompanying drawings: 1 standing wave tube, 2 polyvinylidene fluoride piezoelectric film, 3 sensor, 4 exciter, 5 push-pull handle, 6 adjustable telescopic tube, 7 foamed lightweight soil detection material, 6-1 front telescopic tube, 6-2 middle telescopic tube, 6-3 rear telescopic tube, 6-4 tractor, 6-5 first telescopic adjuster, 6-6 second telescopic adjuster.

5. SPECIFIC EMBODIMENT OF THE INVENTION

The invention is further described in detail hereinafter with reference to the drawings.

Figure 1:
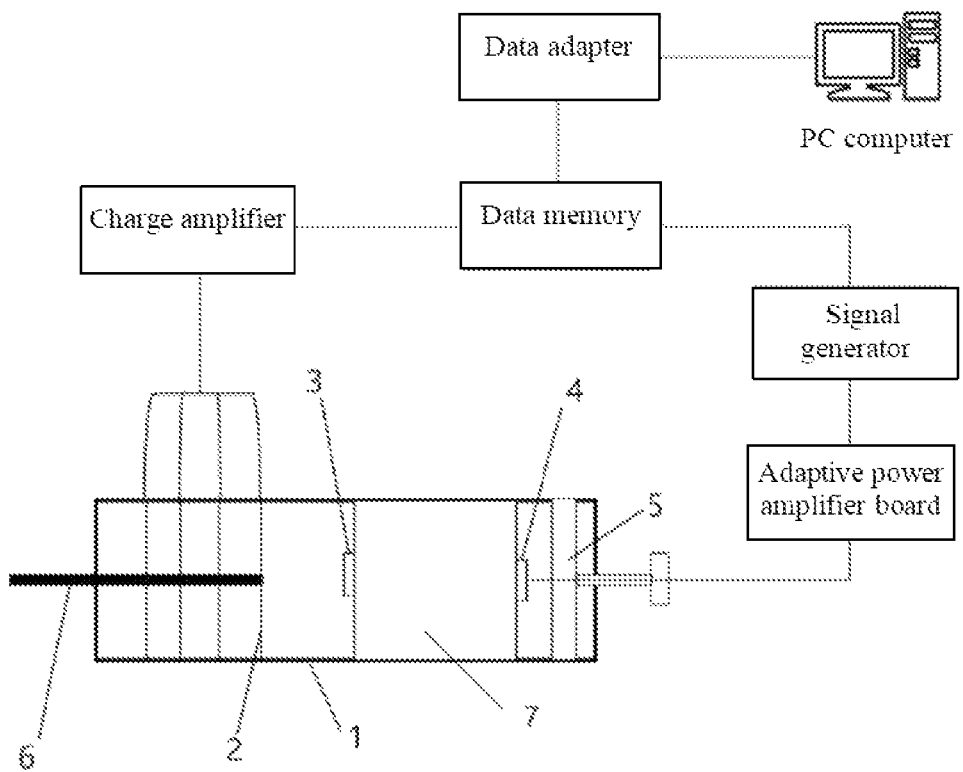
FIG. 1 is a structural diagram of the device for representing the foam porosity state of foamed lightweight soil with self-adjusting beams.

As shown in FIG. 1, the invention provides a device for representing the foam porosity state of foamed lightweight soil with self-adjusting beams, including a standing wave tube 1, a plurality of polyvinylidene fluoride piezoelectric films 2, a sensor 3, an exciter 4, a push-pull handle 5, an adjustable telescopic tube 6, a foamed lightweight soil detection material 7, a charge amplifier, a data memory, a data adapter, a signal generator, an adaptive power amplifier board, and a PC computer;

The foamed lightweight soil detection material 7 is provided on the standing wave tube 1; one side of the foamed lightweight soil detection material 7 is provided with the sensor 3; other side of the foamed lightweight soil detection material 7 is provided with the exciter 4; one side of the standing wave tube 1 proximate to the exciter 4 is provided with the push-pull handle 5; other side of the standing wave tube 1 proximate to the sensor 3 is provided with the adjustable telescopic tube 6; the adjustable telescopic tube 6 is connected to a plurality of polyvinylidene fluoride piezoelectric films 2; and a plurality of polyvinylidene fluoride piezoelectric films 2 are all connected to the charge amplifier; the charge amplifier is communicatively connected to the data memory; the data memory is further communicatively connected to the data adapter and the signal generator, respectively; the data adapter is further connected to the PC computer; the signal generator is further communicatively connected to the adaptive power amplifier board; the adaptive power amplifier board is further communicatively connected to the exciter 4.

5

Figure 2:
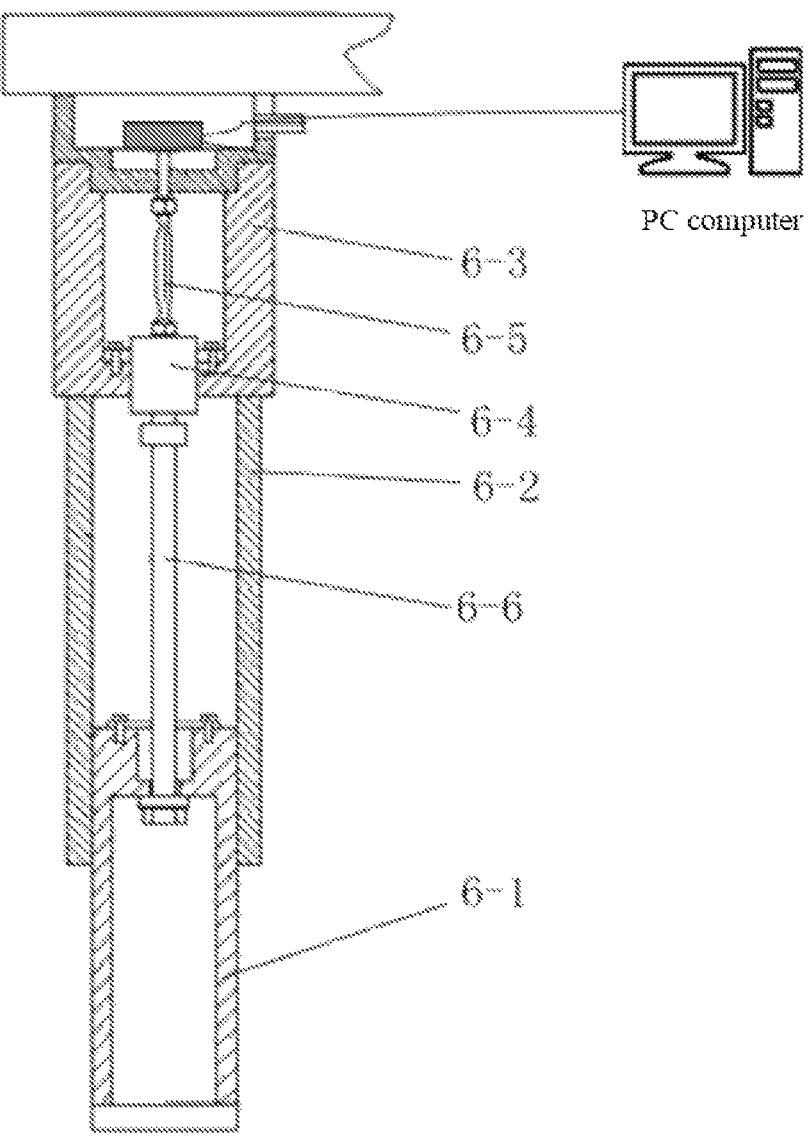
FIG. 2 is a structural diagram of the adjustable telescopic tube.

In the embodiment of the invention, as shown in FIG. 2, the adjustable telescopic tube 6 includes a front telescopic tube 6-1, a middle telescopic tube 6-2, a rear telescopic tube 6-3, a tractor 6-4, a first telescopic adjuster 6-5, and a second telescopic adjuster 6-6;

one end of the front telescopic tube 6-1 is sleeved over one end of the middle telescopic tube 6-2; other end of the middle telescopic tube 6-2 is sleeved over one end of the rear telescopic tube 6-3; the first telescopic adjuster 6-5 is provided in the rear telescopic tube 6-3; the second telescopic adjuster 6-6 is provided in the middle telescopic tube 6-2; and the first telescopic adjuster 6-5 and the second telescopic adjuster 6-6 are connected via the tractor 6-4.

In the embodiment of the invention, diameters of the front telescopic tube 6-1, the middle telescopic tube 6-2, and the rear telescopic tube 6-3 are gradually increased, and when the sound wave is transmitted to the polyvinylidene fluoride piezoelectric films 2 through the foamed lightweight soil detection material 7, generated electric signals are transmitted to the data adapter through the telescopic tube and the tractor 6-4, and then the data is transmitted to the PC computer, and the data obtained will be compared with preset sound wave data in the PC computer, and the feedback data is transmitted to the data adapter through execution of the judgment logic described below, and is then conveyed to the first telescopic adjuster 6-5 and the second telescopic adjuster 6-6, and the first telescopic adjuster 6-5 and the second telescopic adjuster 6-6 are adjusted by feedback, until the first telescopic adjuster 6-5, the second telescopic adjuster 6-6, and the polyvinylidene fluoride piezoelectric films 2 are moved to a predetermined position.

Figure 3:
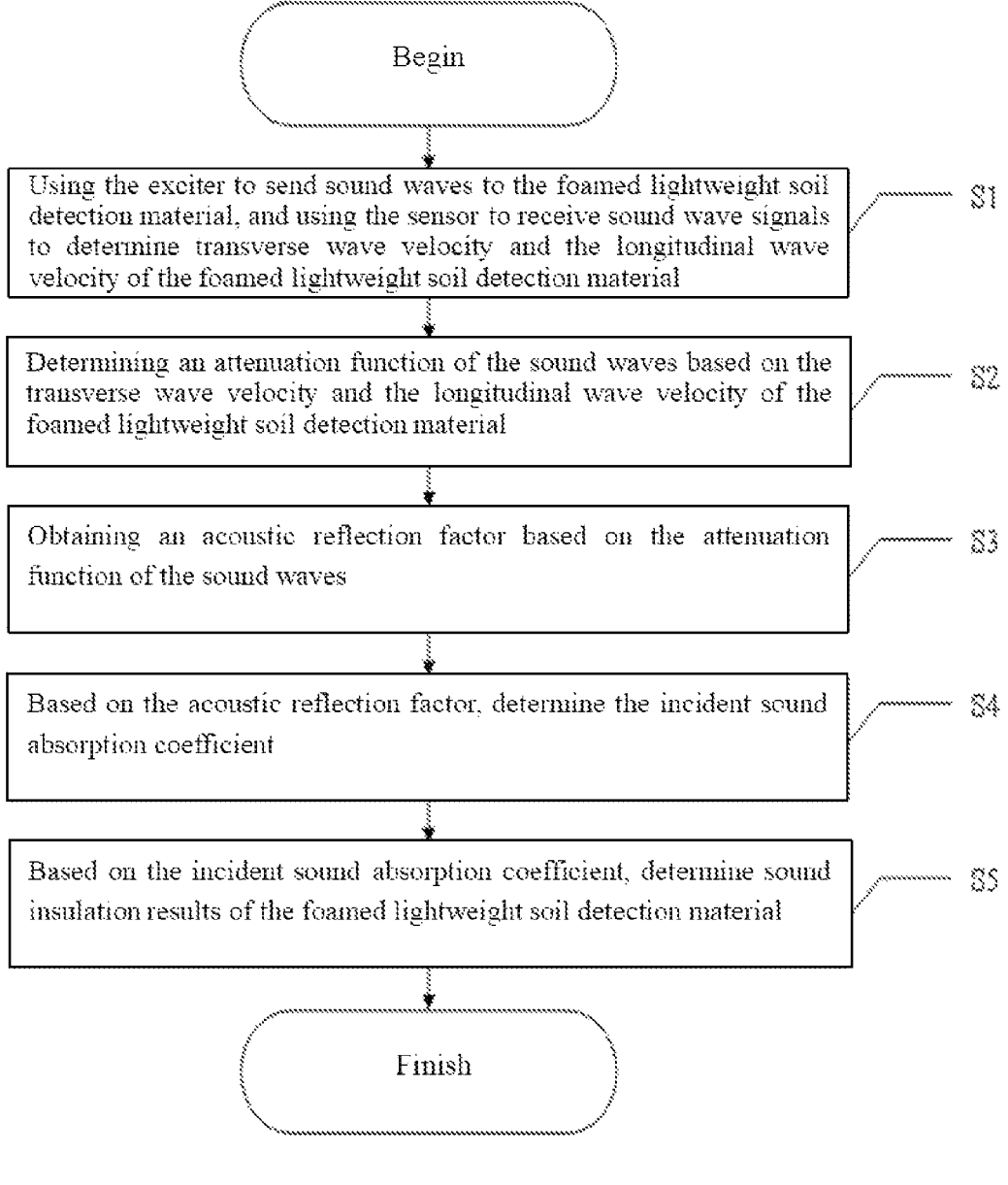
FIG. 3 is a flow chart of a method for representing the foam porosity state of foamed lightweight soil with self-adjusting beams.

Based on the above device, the invention also proposes a method for representing the foam porosity state of foamed lightweight soil with self-adjusting beams, as FIG. 3, comprising the following steps:

S1. using the exciter to send sound waves to the foamed lightweight soil detection material, and using the sensor to receive sound wave signals to determine transverse wave velocity and the longitudinal wave velocity of the foamed lightweight soil detection material;

S2. determining an attenuation function of the sound waves based on the transverse wave velocity and the longitudinal wave velocity of the foamed lightweight soil detection material;

S3. obtaining an acoustic reflection factor based on the attenuation function of the sound waves;

S4. based on the acoustic reflection factor, determine the incident sound absorption coefficient;

S5. based on the incident sound absorption coefficient, determine sound insulation results of the foamed lightweight soil detection material.

In the embodiment of the invention, in S1, the calculation formula for longitudinal wave velocity of the foamed lightweight soil detection material $V_P$ is:

$$V_p = \frac{L}{t_p - t_0};$$

wherein, L denotes length of the foamed lightweight soil detection material, $t_p$ represents time experienced by the longitudinal wave traveling through the foamed lightweight soil detection material, $t_0$ denotes delay time.

In the embodiment of the invention, in S1, the calculation formula for the transverse wave velocity of the foamed lightweight soil detection material $V_S$ is:

$$V_s = \frac{L}{t_s - t_0}$$

wherein, L denotes length of the foamed lightweight soil detection material, $t_0$ denotes delay time, $t_s$ represents time experienced by the transverse wave traveling through the foamed lightweight soil detection material.

In the embodiment of the invention, in S2, expression for attenuation function of the sound wave F(x) is:

$$F(x) = Ae^{-\alpha x}\cos[\beta(x - x_0)];$$

wherein, A denotes amplitude, x denotes relative position of the sound wave from the exciter, $x_0$ indicates relative position of the sound wave when it is emitted, e indicates index, $\alpha$ indicates attenuation coefficient, $\beta$ indicates phase coefficient.

In the embodiment of the invention, in S3, expression for acoustic reflection factor r is:

$$r = \frac{H - e^{-jk_0d}}{e^{jk_0d} - H}e^{2jk_0(l+d)}$$

wherein, H denotes transfer function of the total sound field, e denotes exponent, j denotes complex number, $k_0$ denotes complex wave number, l denotes distance of the polyvinylidene fluoride piezoelectric films from the foamed lightweight soil material, d denotes distance between neighboring polyvinylidene fluoride piezoelectric films.

In the embodiment of the invention, in S4, the calculation formula for the incident sound absorption coefficient R is:

$$R = 1 - |r|^2;$$

wherein, r denotes acoustic reflection factor.

In the embodiment of the invention, according to the requirement, the prepared foamed lightweight soil detection material 7 is arranged on one side of the standing wave tube 1, the exciter 4 is fixedly arranged on one side of the foamed lightweight soil detection material 7 close to the outside, the sensor 3 is fixedly arranged on the other side, and a push-pull handle 5 made of sound insulation material is used for sealing the passage opening on one side close to the outside; corresponding coupling agents are coated between the exciter 4 and the foamed lightweight soil detection material 7 and between the sensor 3 and the foamed lightweight soil detection material 7, sound waves with certain specific frequency are generated by the exciter, and ultrasonic waves pass through the foamed lightweight soil to reach the other end to be received by a receiving sensor;

ratio of the sample length to the time it takes for the ultrasonic waves to pass through the sample is the wave velocity. The wave velocity of the longitudinal wave and the transverse wave at the foamed lightweight soil of such density is obtained; as the longitudinal wave can be transmitted in solid, liquid and gas, while the transverse wave can only be transmitted in the solid, so the foamed lightweight soil detection material 7 with different densities are adopted to carry out the same test according to the method, and the final results are integrated, thereby obtaining a relation graph between the foamed lightweight soil detection material 7 and wave velocity of the sound waves at different densities.

Placing the polyvinylidene fluoride piezoelectric films 2 fixed together by the adjustable telescopic tubes 6 into other side of the standing wave tube 1, and adjusting the distance between every two polyvinylidene fluoride piezoelectric films 2 according to requirements to obtain voltages of the polyvinylidene fluoride piezoelectric films 2 at different positions;

the voltage value obtained is amplified by the charge amplifier and then output to the PC computer after being saved and processed in the memory, and obtaining sound insulation coefficients of the foamed lightweight soil detection material 7 under different densities under the action of sound waves with different frequencies by corresponding calculation so as to judge the sound insulation effect of the foamed lightweight soil detection material 7 under such density.

When the sound wave of the exciter 4 is transmitted through the foamed lightweight soil detection material 7 and then enters the polyvinylidene fluoride piezoelectric film 2, surface of the polyvinylidene fluoride piezoelectric film 2 is polarized, and a voltage difference is generated on the surface. Considering that sound waves of the exciter 4 are still attenuated in the air after passing through the foamed lightweight soil detection material 7, it is necessary to consider the attenuation of the sound wave in the air. According to the sound wave attenuation formula, magnitude of the sound waves at different distances from the foamed lightweight soil detection material 7 can be obtained, which is compared with magnitude of the sound waves received by the polyvinylidene fluoride piezoelectric film 2 at the preset position, and the result can be verified. The transfer function of the total sound field can be obtained from the transfer function of the sound wave: the acoustic reflection factor can be derived from the transfer function of the total sound field. The incident sound absorption coefficient can be obtained according to the obtained reflection factor. The sound insulation capability of the foamed lightweight soil detection material with different densities can be judged according to the obtained sound absorption coefficient.

The intensity of signals received by the polyvinylidene fluoride piezoelectric films 2 at different positions is judged through the PC computer, a self-adjusting control system in the PC computer is used for carrying out threshold value analysis on required sound insulation effect to judge whether the transmitted sound wave signals meet preset sound insulation effects of different levels or not, and judgment conditions are set as:

$$Yes = \{K = db\};$$

$$NO = \begin{cases} K > db \\ K < db \end{cases};$$

wherein Yes indicates that magnitude of the sound wave received by the polyvinylidene fluoride piezoelectric film at this position satisfies the preset sound insulation effect, NO indicates that magnitude of the sound wave received by the polyvinylidene fluoride piezoelectric film at this position does not satisfy the preset sound insulation effect, K indicates magnitude of the sound wave received by the polyvinylidene fluoride piezoelectric film at this position, db indicates preset magnitude of the sound wave received by the polyvinylidene fluoride piezoelectric film at this position.

The formula used for the adjustable telescopic tube is:

$$K = R\{d_j, r, \Delta Sec, \varphi_j, \rho_j\};$$

if K>db, then $$K = \begin{cases} R(d_j + \Delta d, r, \Delta Sec, \varphi_j, \rho_j) \\ R(d_j, r \pm \Delta r, \Delta Sec, \varphi_j, \rho_j) \\ R(d_j, r, \Delta Sec \pm \varepsilon \cdot \Delta Sec, \varphi_j, \rho_j) \\ R(d_j, r, \Delta Sec, \varphi_j \pm \Delta \varphi_j, \rho_j) \\ R(d_j, r, \Delta Sec, \varphi_j, \rho_j \pm \Delta \rho_j) \end{cases};$$

if K<db, then $$K = \begin{cases} R(d_j - \Delta d, r, \Delta Sec, \varphi_j, \rho_j) \\ R(d_j, r \pm \Delta r, \Delta Sec, \varphi_j, \rho_j) \\ R(d_j, r, \Delta Sec \pm \varepsilon \cdot \Delta Sec, \varphi_j, \rho_j) \\ R(d_j, r, \Delta Sec, \varphi_j \pm \Delta \varphi_j, \rho_j) \\ R(d_j, r, \Delta Sec, \varphi_j, \rho_j \pm \Delta \rho_j) \end{cases};$$

wherein

K indicates magnitude of the sound wave received by the polyvinylidene fluoride piezoelectric film at this position, j indicates a jth time of excitation, $d_j$ indicates distance from different polyvinylidene fluoride piezoelectric films to the foamed lightweight soil detection material, Δd indicates distance of the polyvinylidene fluoride piezoelectric film adjusted by the adjustable telescopic tube according to the preset requirements, $R_j$ indicates the ratio of sound pressure to voltage at different positions, ΔR indicates a change in the ratio, r indicates the acoustic reflection factor, Δr indicates a change of the reflection factor for different foamed lightweight soil detection material, ΔSec indicates time interval of continuous excitation, ε indicates interval adjustment factor for the excitation time, $\varphi_j$ indicates phase difference value of the excitation $\Delta\varphi_j$ indicates a change in phase difference of the excitation, $\rho_j$ indicates density of the foamed lightweight soil detection material, $\Delta\rho_j$ indicates a change in density of different foamed lightweight soil detection material, db indicates preset magnitude of the sound wave received by the polyvinylidene fluoride piezoelectric film at this position $R\{\cdot\}$ is a function expression.

It should be noted that the execution logic of the above algorithm is as follows: if the judgment of a single excitation does not pass, the above parameters will be adjusted, and the comparison will be made according to the magnitude of the sound wave at the current position as a reference, and if the sound wave is smaller, it means that the position of the polyvinylidene fluoride piezoelectric film at that position on the telescopic tube is far from the preset position, and the parameters will be subjected to automatic adjusting iteration, and step size of each iteration is about one-tenth of the initial parameter, and thereafter the magnitude of K is calculated again and compared again until constraints are satisfied, otherwise other parameters are replaced and the operation is repeated.

Those of ordinary skill in the art will realize that embodiments described herein are intended to assist the reader in understanding principles of the present invention, and it should be understood that protection scope of the present invention is not limited to such particular statements and embodiments. Those of ordinary skill in the art may make various other specific deformations and combinations based on these technical revelations disclosed herein that do not depart from the substance of the present invention, and these deformations and combinations remain within the protection scope of the present invention.

What is claimed is:

1. A device for representing foam porosity state of foamed lightweight soil with self-adjusting beams includes a standing wave tube (1), a plurality of polyvinylidene fluoride piezoelectric films (2), a sensor (3), an exciter (4), a push-pull handle (5), an adjustable telescopic tube (6), a foamed lightweight soil detection material (7), a charge amplifier, a data memory, a data adapter, a signal generator, an adaptive power amplifier board, and a PC computer, the foamed lightweight soil detection material (7) is provided on the standing wave tube (1); one side of the foamed lightweight soil detection material (7) is provided with the sensor (3); other side of the foamed lightweight soil detection material (7) is provided with the exciter (4); one side of the standing wave tube (1) proximate to the exciter (4) is provided with the push-pull handle (5); other side of the standing wave tube (1) proximate to the sensor (3) is provided with the adjustable telescopic tube (6); the adjustable telescopic tube (6) is connected to the plurality of polyvinylidene fluoride piezoelectric films (2); and the plurality of polyvinylidene fluoride piezoelectric films (2) are all connected to the charge amplifier; the charge amplifier is communicatively connected to the data memory; the data memory is further communicatively connected to the data adapter and the signal generator, respectively; the data adapter is further connected to the PC computer; the signal generator is further communicatively connected to the adaptive power amplifier board; the adaptive power amplifier board is further communicatively connected to the exciter (4).

2. The device for representing the foam porosity state of foamed lightweight soil with self-adjusting beams of claim 1, wherein the adjustable telescopic tube (6) includes a front telescopic tube (6-1), a middle telescopic tube (6-2), a rear telescopic tube (6-3), a tractor (6-4), a first telescopic adjuster (6-5), and a second telescopic adjuster (6-6);

one end of the front telescopic tube (6-1) is sleeved over one end of the middle telescopic tube (6-2); other end of the middle telescopic tube (6-2) is sleeved over one end of the rear telescopic tube (6-3); the first telescopic adjuster (6-5) is provided in the rear telescopic tube (6-3); the second telescopic adjuster (6-6) is provided in the middle telescopic tube (6-2); and the first telescopic adjuster (6-5) and the second telescopic adjuster (6-6) are connected via the tractor (6-4).

3. A method for representing the foam porosity state of foamed lightweight soil with self-adjusting beams of claim 1, comprising the following steps:

S1: using the exciter to send sound waves to the foamed lightweight soil detection material, and using the sensor to receive sound wave signals to determine transverse wave velocity and longitudinal wave velocity of the foamed lightweight soil detection material;

S2: determining an attenuation function of the sound waves based on the transverse wave velocity and the longitudinal wave velocity of the foamed lightweight soil detection material;

S3: obtaining an acoustic reflection factor based on the attenuation function of the sound waves;

S4: based on the acoustic reflection factor, determine an incident sound absorption coefficient;

S5: based on the incident sound absorption coefficient, determine sound insulation results of the foamed lightweight soil detection material.

4. The method for representing the foam porosity state of foamed lightweight soil with self-adjusting beams of claim 3, wherein in S1, calculation formula for the longitudinal wave velocity of the foamed lightweight soil detection material $V_p$ is:

$$V_p = \frac{L}{t_p - t_0};$$

wherein, L denotes length of the foamed lightweight soil detection material, $t_p$ represents time experienced by the longitudinal wave traveling through the foamed lightweight soil detection material, $t_o$ denotes delay time.

5. The method for representing the foam porosity state of foamed lightweight soil with self-adjusting beams of claim 3, wherein in S1, calculation formula for the transverse wave velocity of the foamed lightweight soil detection material $V_s$ is:

$$V_s = \frac{L}{t_s - t_0}$$

wherein, L denotes length of the foamed lightweight soil detection material, $t_o$ denotes the delay time, $t_s$ represents time experienced by the transverse wave traveling through the foamed lightweight soil detection material.

6. The method for representing the foam porosity state of foamed lightweight soil with self-adjusting beams of claim 3, wherein in S2, expression for attenuation function of the sound wave F(x) is:

$$F(x) = Ae^{-\alpha x}\cos[\beta(x - x_0)];$$

wherein, A denotes amplitude, x denotes relative position of the sound wave from the exciter, $x_o$ indicates relative position of the sound wave when it is emitted, e indicates index, $\alpha$ indicates attenuation coefficient, $\beta$ indicates phase coefficient.

7. The method for representing the foam porosity state of foamed lightweight soil with self-adjusting beams of claim 3, wherein in S3, expression for acoustic reflection factor r is:

$$r = \frac{H - e^{-jk_0 d}}{e^{jk_0 d} - H} e^{2jk_0(l+d)}$$

wherein, H denotes transfer function of the total sound field, e denotes exponent, j denotes complex number, $k_o$ denotes complex wave number, l denotes distance of the polyvinylidene fluoride piezoelectric films from the foamed lightweight soil material, d denotes distance between neighboring polyvinylidene fluoride piezoelectric films.

8. The method for representing the foam porosity state of foamed lightweight soil with self-adjusting beams of claim 3, wherein in S4, calculation formula for the incident sound absorption coefficient R is:

$$R = 1 - |r|^2;$$

wherein, r denotes acoustic reflection factor.

\*    \*    \*    \*    \*